(12) United States Patent
Lee et al.

(10) Patent No.: US 12,477,311 B2
(45) Date of Patent: Nov. 18, 2025

(54) GROUPING METHOD AND SYSTEM USING BLUETOOTH-BASED STAR NETWORK

(71) Applicant: DABIDA CORP., Anyang-si (KR)

(72) Inventors: Eunseung Lee, Gwangju (KR); Hyunsoo Kim, Yongin-si (KR)

(73) Assignee: DABIDA CORP., Gyeonggi-do (KR)

( * ) Notice: Subject to any disclaimer, the term of this patent is extended or adjusted under 35 U.S.C. 154(b) by 351 days.

(21) Appl. No.: 17/923,211

(22) PCT Filed: May 18, 2021

(86) PCT No.: PCT/KR2021/006176
§ 371 (c)(1),
(2) Date: Nov. 3, 2022

(87) PCT Pub. No.: WO2021/235809
PCT Pub. Date: Nov. 25, 2021

(65) Prior Publication Data
US 2023/0164522 A1  May 25, 2023

(30) Foreign Application Priority Data

May 21, 2020 (KR) .......................... 10-2020-0060711

(51) Int. Cl.
*H04W 4/08* (2009.01)
(52) U.S. Cl.
CPC ..................................... *H04W 4/08* (2013.01)
(58) Field of Classification Search
CPC ...................................................... H04W 4/08
See application file for complete search history.

(56) References Cited

U.S. PATENT DOCUMENTS

2002/0044549 A1* 4/2002 Johansson ............... H04L 45/04
370/386
2002/0168943 A1* 11/2002 Callaway, Jr. ......... G01S 5/0289
455/67.11

(Continued)

FOREIGN PATENT DOCUMENTS

KR  10-2007-0009214 A  1/2007
KR  10-2010-0083228 A  7/2010

(Continued)

OTHER PUBLICATIONS

International Search Report in International Application No. PCT/KR2021/006176, dated Aug. 13, 2021, 3pages.

*Primary Examiner* — Wen W Huang
(74) *Attorney, Agent, or Firm* — Park, Kim & Suh, llc (57) ABSTRACT

Disclosed are grouping method and system using a Bluetooth-based star network. The present embodiment provides grouping method and system using a Bluetooth-based star network, which group an instructor and members into a primary group by using a star network so that the instructor can detect the breakaway of a moving group in the outdoors, without using a direction finding technology of a beacon that requires the use of a fixed transmitter and receiver, and allow some members of the primary group to be instructors and members, and then use the star network to allow same to be grouped into subordinate members and secondary groups, and thus a leading instructor is notified of moving farther away from the group by using messages sent therebetween.

10 Claims, 5 Drawing Sheets

(56) References Cited

U.S. PATENT DOCUMENTS

| | | | | |
|---|---|---|---|---|
| 2003/0099212 | A1* | 5/2003 | Anjum | H04W 92/02 |
| | | | | 370/328 |
| 2008/0040509 | A1 | 2/2008 | Werb et al. | |
| 2011/0187931 | A1* | 8/2011 | Kim | H04N 21/485 |
| | | | | 348/E5.105 |
| 2014/0293978 | A1* | 10/2014 | Yang | H04L 67/51 |
| | | | | 370/338 |
| 2018/0227193 | A1* | 8/2018 | Singamsetty | H04L 41/22 |
| 2020/0404513 | A1* | 12/2020 | Hayes | H04W 24/02 |
| 2021/0092797 | A1* | 3/2021 | Miyamoto | H04W 8/005 |

FOREIGN PATENT DOCUMENTS

| | | |
|---|---|---|
| KR | 10-2011-0028103 A | 3/2011 |
| KR | 10-1615663 B1 | 4/2016 |

\* cited by examiner

GROUPING METHOD AND SYSTEM USING BLUETOOTH-BASED STAR NETWORK

CROSS-REFERENCE TO RELATED APPLICATIONS

This application is the National Stage filing under 35 U.S.C. 371 of International Application No. PCT/KR2021/006176, filed on May 18, 2021, which claims the benefit of Korean Patent Application No. 10-2020-0060711, filed on May 21, 2020, the contents of which are all hereby incorporated by reference herein in their entirety.

TECHNICAL FIELD

An embodiment of the present invention relates to grouping method and system using a Bluetooth-based star network.

BACKGROUND ART

The contents described below merely provide only background information related to the present embodiment and do not constitute the prior art.

With the recent increase in the use of multi-use facilities and group outdoor activities, the incidence of disappearance of objects (infants, the elderly, intellectual disabilities, etc.) in need of protection and management is gradually increasing. There are many cases of occurring in multi-use facilities crowded with people such as large marts, amusement parks, and terminals in family units.

Since infants and persons with intellectual disabilities have short attention span at the time of the group activities in the form of nature learning and field trips in kindergartens and welfare facility groups, there are frequent cases of group departure due to distraction and sudden behavior. In addition, the elderly (including the elderly with dementia) often break away from the group due to their own actions during group tours and viewings at home and abroad. When breaking away from the group, they may not be aware whether to break away from the group.

In the event of group activities, when a person break away from a group's allowable range, there is a need for a system for not only alerting parents and managers immediately through notification (sound and vibration), but also notifying all persons subject to protection management, including the breakaway person of the occurrence of the breakaway person to find the breakaway person early, thereby preventing the disappearance.

Techniques for detecting the breakaway person have been variously researched, but there is a technique capable of checking a movement path of the other party away from a group by calculating a self-position between the respective devices using a plurality of devices connected with a conventional short-range wireless network, calculating a distance by exchanging the calculated self-position, and designating a current position as an absolute position while outputting an alarm when the self-position exceeds a set reference distance to calculate a self-moving distance.

In addition, as a technique for recognizing breakaway persons from the group in the related art, there is a technique in which each of a plurality of member terminals performing group activities receives radio waves transmitted from each other to detect the intensities of the radio waves, obtains a distance between a plurality of member terminals from the detected intensities of the radio waves, and outputs a warning when there is a terminal having a distance between the member terminals of a reference distance or more among the plurality of member terminals after acquiring the reference distance based on the acquired distance between the member terminals.

Most of the above-described prior arts use a method of measuring a distance or detecting a breakaway person through a communication distance of a protector terminal. When the breakaway person is detected through the communication distance of the protector terminal, there may be a situation in which it is determined as a breakaway person even if not break away. Accordingly, there is a need for a technique to determine the breakaway between moving nodes through a star network connected between the respective terminals instead of performing communication between terminals centered on the protector terminal.

DISCLOSURE

Technical Problem

An object of the present embodiment is to provide grouping method and system using a Bluetooth-based star network, which group an instructor and members into a primary group by using a star network so that the instructor can detect the breakaway of a moving group in the outdoors, without using a direction finding technology of a beacon that requires the use of fixed transmitter and receiver, and allow some members of the primary group to be instructors and members, and then use the star network to allow some members to be grouped into subordinate members and secondary groups, so that a leading instructor is notified of moving farther away from the group by using messages sent therebetween.

Technical Solution

According to an aspect of the present invention, there is provided a grouping system using a Bluetooth-based star network including: a primary instructor terminal that is paired with a plurality of member terminals by a predetermined number based on Bluetooth to form a primary group constituting a star network; a secondary instructor terminal in which some members of the primary group are paired with a predetermined number of other member terminals based on Bluetooth, which are not paired with the primary instructor terminal among the plurality of member terminals as the instructor and the member to form a secondary group constituting a subordinate star network of the primary group; and a management terminal which is paired with the primary instructor terminal to visually display tags of the member terminals breaking away from or joined in the primary group and the secondary group.

According to another aspect of the present invention, there is provided a grouping method using a Bluetooth-based star network including: a process of pairing a primary instructor terminal with a plurality of member terminals by a predetermined number based on Bluetooth to form a primary group constituting a star network; process of pairing, by a secondary instructor terminal, some members of the primary group with a predetermined number of other member terminals based on Bluetooth, which are not paired with the primary instructor terminal among the plurality of member terminals as the instructor and the member to form a secondary group constituting a subordinate star network of the primary group; and a process of visually displaying, by a management terminal which is paired with the primary instructor terminal, tags of the member terminals breaking away from or joined in the primary group and the secondary group.

Advantageous Effects

As described above, according to the present embodiment, it is possible to notify a leading instructor of moving farther away from the group by using messages sent therebetween by grouping an instructor and members into a primary group by using a star network so that the instructor can detect the breakaway of a moving group in the outdoors, without using a direction finding technology of a beacon that requires the use of fixed transmitter and receiver, and allowing some members of the primary group to be instructors and members, and then using the star network to allow some members to be grouped into subordinate members and secondary groups.

According to the present embodiment, it is possible to allow an instructor to easily detect the breakaway of members of a moving group on board a school bus or a school bus.

EXPLANATION OF REFERENCE NUMERALS FOR MAIN PARTS OF DRAWINGS

110: Primary instructor terminal
120: Member terminal
130: Management terminal
210: Secondary instructor terminal
220: Additional secondary instructor terminal

MODES FOR THE INVENTION

Hereinafter, the present embodiment will be described in detail with reference to the accompanying drawings.

Figure 1:
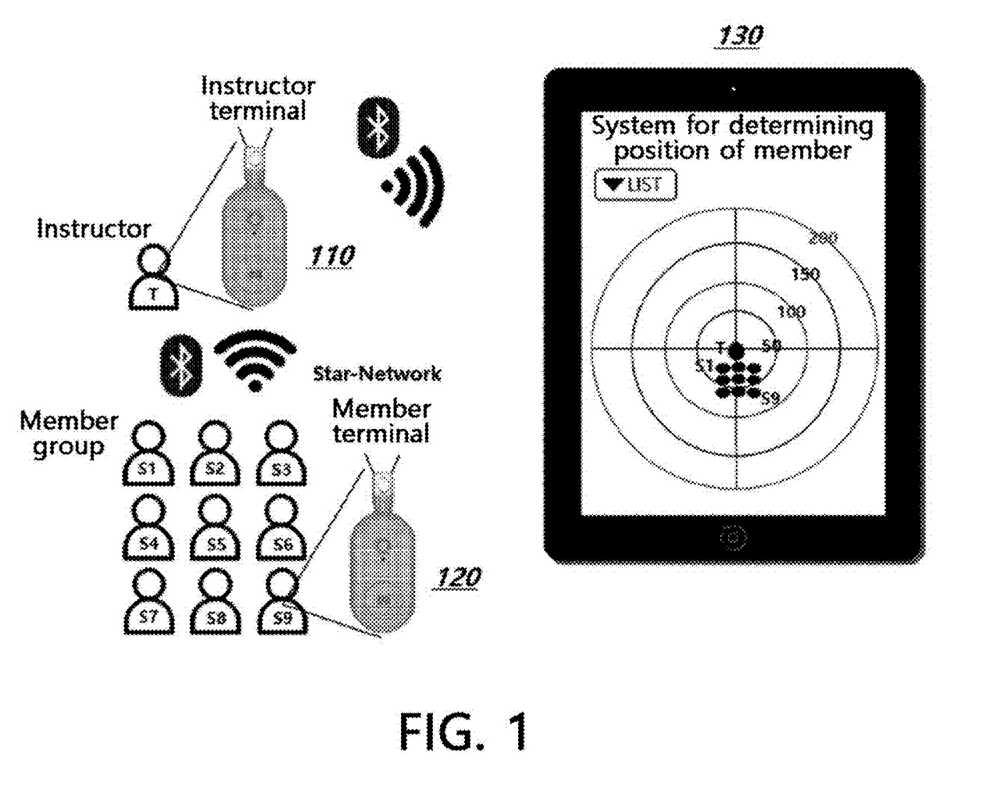
FIG. 1 is a diagram schematically illustrating a grouping system using a Bluetooth-based star network according to the present embodiment.

FIG. 1 is a diagram schematically illustrating a grouping system using a Bluetooth-based star network according to the present embodiment.

The grouping system using a Bluetooth-based star network according to the present embodiment includes a primary instructor terminal 110, a member terminal 120, and a management terminal 130. Components included in the grouping system using the Bluetooth-based star network are not necessarily limited thereto.

The primary instructor terminal 110, the member terminal 120, and the management terminal 130 according to the present embodiment refer to devices capable of tracking a position based on BLE 5.

The primary instructor terminal 110 is a wearable device implemented in the form of a bracelet, a necklace, a watch, and the like, and preferably refers to an electronic device supporting a BLE 5-based position tracking function.

The member terminal 120 is a wearable device implemented in the form of a bracelet, a necklace, a watch, and the like, and preferably refers to an electronic device supporting a BLE 5-based position tracking function.

The primary instructor terminal 110 and the member terminal 120 may include a microphone and a speaker to transmit and receive audio signals to and from each other. The primary instructor terminal 110 may broadcast a message to all member terminals 120 included in a member group. The primary instructor terminal 110 may individually send a direct message using a unique ID (virtual ID) of the member terminal 120.

The management terminal 130 refers to an electronic device that communicates with the primary instructor terminal 110 via a short-range network according to a user's key manipulation. The management terminal 130 includes a memory for storing a program or protocol for communicating with the primary instructor terminal 110 via a short-range network, a microprocessor for executing and controlling the corresponding program, and the like.

The management terminal 130 may be an electronic device such as a smart phone, a tablet, a laptop, a personal computer (PC), a personal digital assistant (PDA), and a portable multimedia player (PMP), a wireless communication terminal, and a media player.

The management terminal 130 is various devices including (i) a communication device such as a communication modem for performing communication with various devices or wired and wireless networks, (ii) a memory for storing various programs and data, (iii) a microprocessor for operation and control by executing the program, and the like. According to at least one embodiment, the memory may be a computer readable recording/storage medium, such as a random access memory (RAM), a read only memory (ROM), a flash memory, an optical disk, a magnetic disk, a solid state disk (SSD), etc. According to at least one embodiment, a microprocessor may be programmed to selectively perform one or more of operations and functions described herein. According to at least one embodiment, the microprocessor may be implemented in whole or in part as hardware such as an application specific integrated circuit (ASIC) of a specific configuration and the like.

The management terminal 130 is paired with the primary instructor terminal to visually display tags of the member terminals breaking away from or joined in a primary group and a secondary group.

For example, as illustrated in FIG. 1, when a teacher leads about 20 students in a kindergarten to visit an amusement park, the students need to frequently check the breakaway while moving. If a breakaway person occurs, it is necessary to quickly find the position of the breakaway person.

Accordingly, it is preferable to determine how much the students are far away from the teacher and where the students are located based on the position using the primary instructor terminal 110, the member terminal 120, and the management terminal 130 that support BLE 5.

The students wear the member terminal 120 that is a wearable device (e.g., bracelet, and necklace) capable of BLE 5-based position tracking. The teacher performs BLE 5-based short-range communication with each member terminal 120 using the primary instructor terminal 110. Here, the primary instructor terminal 110 is connected to the management terminal 130 to display the center like a radar.

The wearable member terminal 120 worn by about 20 students is connected to the primary instructor terminal 110 through short-distance communication.

The primary instructor terminal 110 communicates with the management terminal 130 to display, on the management terminal 130, how much the member terminals 120 connected to the primary instructor terminal 110 are separated from the center and where the member terminal 120 is located, in the form of a tag of S1, S2, S3 . . . S20 of identification numbers assigned to each member terminal 120.

The primary instructor terminal 110 and the member terminal 120 can communicate with each other at a maximum distance of about 1 km. Since BLE 5-based communication is performed using the primary instructor terminal 110 and the member terminal 120, the instructor may quickly identify the breakaway of the member when taking out the member or going to and from school.

Figure 2:
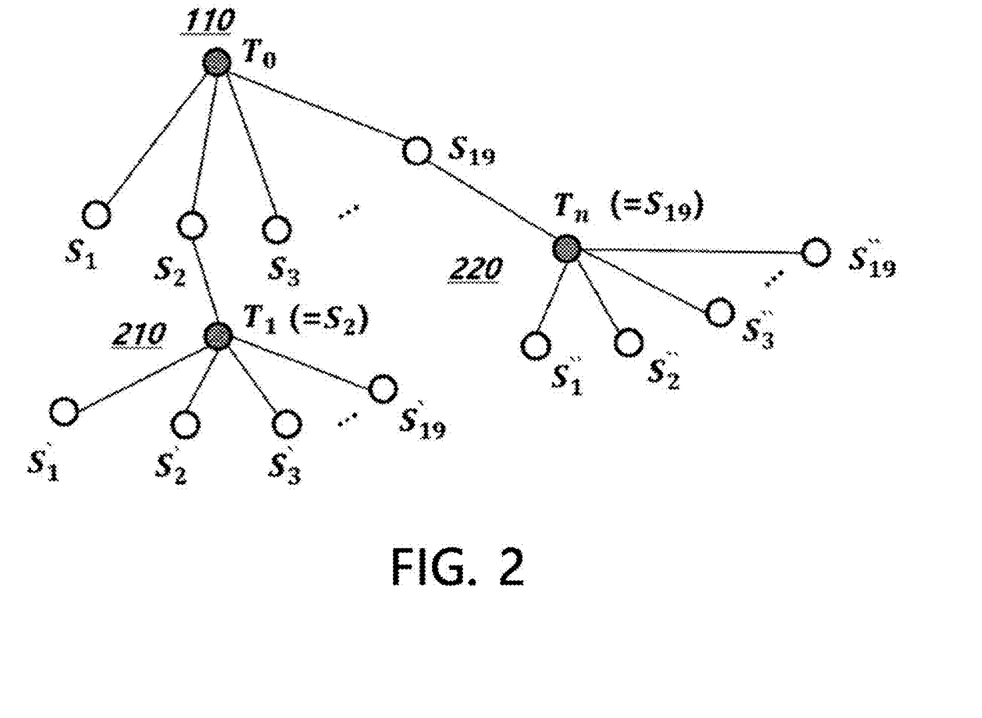
FIG. 2 is a diagram illustrating a grouping method using a Bluetooth-based star network according to the present embodiment.

FIG. 2 is a diagram illustrating a grouping method using a Bluetooth-based star network according to the present embodiment.

A grouping system using a Bluetooth-based star network according to the present embodiment may notify a leading instructor of moving farther away from a group by using messages sent therebetween by grouping an instructor and members into a primary group by using a star network so that the instructor can detect the breakaway of a moving group in the outdoors, without using a direction finding technology of a beacon that requires the use of fixed transmitter and receiver, and allowing some members of the primary group to be instructors and members (multi rolls), and then using the star network to allow some members to be grouped into subordinate members and secondary groups.

The grouping system using the Bluetooth-based star network according to the present embodiment does not use the direction finding technology of the beacon to enable transmission and reception between the primary instructor terminal 110 and the member terminals in the primary group or the secondary group by loading a large amount of data (e.g., voice signal, etc.) in an advertising packet.

First, the primary instructor terminal 110 is set. The primary instructor terminal 110 operates in a standby state. The primary instructor terminal 110 is paired with a plurality of member terminals 120 for configuring the star network based on Bluetooth. The member terminal 120 is paired with the primary instructor terminal 110 in the standby state when a provided button is input. The primary instructor terminal 110 forms a primary group when the plurality of paired member terminals 120 are connected.

The primary instructor terminal 110 checks discovery names of the plurality of member terminals 120 to be paired, and allows only terminals having names matching predetermined names among the discovery names to be paired so as to form the primary group.

Thereafter, the primary instructor terminal 110 sets one of the members of the primary group as the secondary instructor terminal 210 which is the instructor and the member. The secondary instructor terminal 210 is paired with a plurality of member terminals 120 for configuring a subordinate star network based on Bluetooth. The member terminal 120 is paired with the secondary instructor terminal 210 in the standby state when a provided button is input. The secondary instructor terminal 210 constitutes a secondary group when the plurality of paired member terminals 120 are connected.

The secondary instructor terminal 210 checks discovery names of the plurality of member terminals 120 to be paired, and allows only terminals having names matching predetermined names among the discovery names to be paired so as to form the secondary group.

When the plurality of member terminals 120 are paired with the primary instructor terminal 110, if there is a member terminal 120 requiring the paring with the primary instructor terminal 110 even after a predetermined number (e.g., 20) of member terminals 120 have been all paired with the primary instructor terminal 110 in the time order, the primary instructor terminal 110 sets one of the members of the primary group as the secondary instructor terminal 210 which is an instructor and a member.

In other words, the member terminal 120 that is located closer to the primary instructor terminal 110 is first paired with the primary instructor terminal 110, and the member terminal 120 that is located further away from the primary instructor terminal 110 is not paired with the primary instructor terminal 110. The primary instructor terminal 110 is paired with the member terminals 120 in the order of increasing RSSI or the time order of requesting a connection to form the primary group.

Thereafter, if there is a member terminal 120 requesting pairing even after all the plurality of member terminals 120 have been paired by a predetermined number (e.g., 20) in the time order, the primary instructor terminal 110 sets one of the members of the primary group as the secondary instructor terminal 210 which is an instructor and a member.

When the member terminal 120 is connected to the primary instructor terminal 110, the member terminal 120 transmits its own discovery name to the connected primary instructor terminal 110.

After the primary instructor terminal 110 sets one of the members of the primary group as the secondary instructor terminal 210 which is the instructor and the member, the primary instructor terminal 110 receives a report indicating that all the member terminals 120 have been paired by the predetermined number, from the secondary instructor terminal 210.

The primary instructor terminal 110 sets the other one of the members of the primary group as the secondary instructor terminal 220 which is the instructor and the member. The primary instructor terminal 110 checks the discovery names of the plurality of member terminals 120 to be paired. The primary instructor terminal 110 extracts only terminals having names that match predetermined names among the discovery names.

The primary instructor terminal 110 additionally checks subnames of the discovery names to group only terminals having the same subnames to be paired so as to form the primary group. Here, the member terminal 120 changes the subnames of the discovery names by adjusting the number of input times of a button provided in a group setting step (e.g., subname A when the button is input 3 times, subname B when the button is input 4 times, and subname C when the button is input 5 times).

The secondary instructor terminal 210 checks the discovery names of the plurality of member terminals 120 to be paired. The secondary instructor terminal 210 extracts only terminals having names that match predetermined names among the discovery names.

The secondary instructor terminal 210 additionally checks subnames of the discovery names to group only terminals having the same subnames to be paired so as to form the secondary group. Here, the member terminal 120 changes the subnames of the discovery names by adjusting the number of input times of a button provided in a group setting step (e.g., subname A when the button is input 3 times, subname B when the button is input 4 times, and subname C when the button is input 5 times).

The primary instructor terminal 110 is connected with a terminal in the primary group. The primary instructor terminal 110 sets a member terminal (member ID S2) and a member terminal (member ID S20) among the terminals in the primary group as the secondary instructor terminals 210 and 220.

In the primary instructor terminal 110, when there are 20 terminals as the primary group, if a member terminal (member ID S7) breaks away, a disconnection event (GAP Event) occurs in which the connection between the primary instructor terminal 110 and the member terminal (member ID S7) is broken. When the disconnection event occurs, both the primary instructor terminal 110 and the member terminal (member ID S7) recognize that the connection therebetween is broken.

When it is recognized that the member terminal (member ID S7) breaks far away from the primary instructor terminal 110, in both the primary instructor terminal 110 and the member terminal (member ID S7), a message to join the group may be output while an LED flashes.

When the member terminal (member ID S7) moves toward the primary instructor terminal 110, the member terminal (member ID S7) switches to am advertising state from the state in which the disconnection event has occurred.

Thereafter, when the member terminal (member ID S7) joins toward the primary instructor terminal 110, the member terminal (member ID S7) is again connected to the primary group, and the disconnection event is converted into a connection event.

When the member terminal (member ID S7) moves within a predetermined distance, the primary instructor terminal 110 generates a connection event to connect the member terminal (member ID S7) to the primary group.

When the member terminal (member ID S7) is connected to the primary instructor terminal 110 again, the member terminal (member ID S7) changes the discovery name to indicate a connected S7, and then switches to an advertising state that periodically transmits information necessary for network management.

Accordingly, the member terminal (member ID S7) changes the discovery name to be joined in the primary group so as not to be connected to another group.

The primary instructor terminal 110 generates a notification warning to the member terminals 120 of which RSSI falls below a predetermined threshold. That is, the primary instructor terminal 110 recognizes that the member of which the RSSI falls below the predetermined threshold is moving away to generate a breakaway prevention message (sound, text, etc.) as an alarm to the member terminal 120.

When a member terminal (member ID S2) among the terminals in the primary group is set as a secondary instructor terminal $T_1$ 210, the secondary instructor terminal 210 (as the instructor and the member terminal) operates in the same manner as a primary instructor terminal $T_0$ 110 when a connection event and a disconnection event occur in the secondary group. The secondary instructor terminal $T_1$ operates as a clone concept of the primary instructor terminal $T_0$ 110.

The primary instructor terminal $T_0$ 110 is connected with the management terminal 130 to visually display tags of the member terminals to break away from or be joined in the member group on the management terminal 130.

Figure 3:
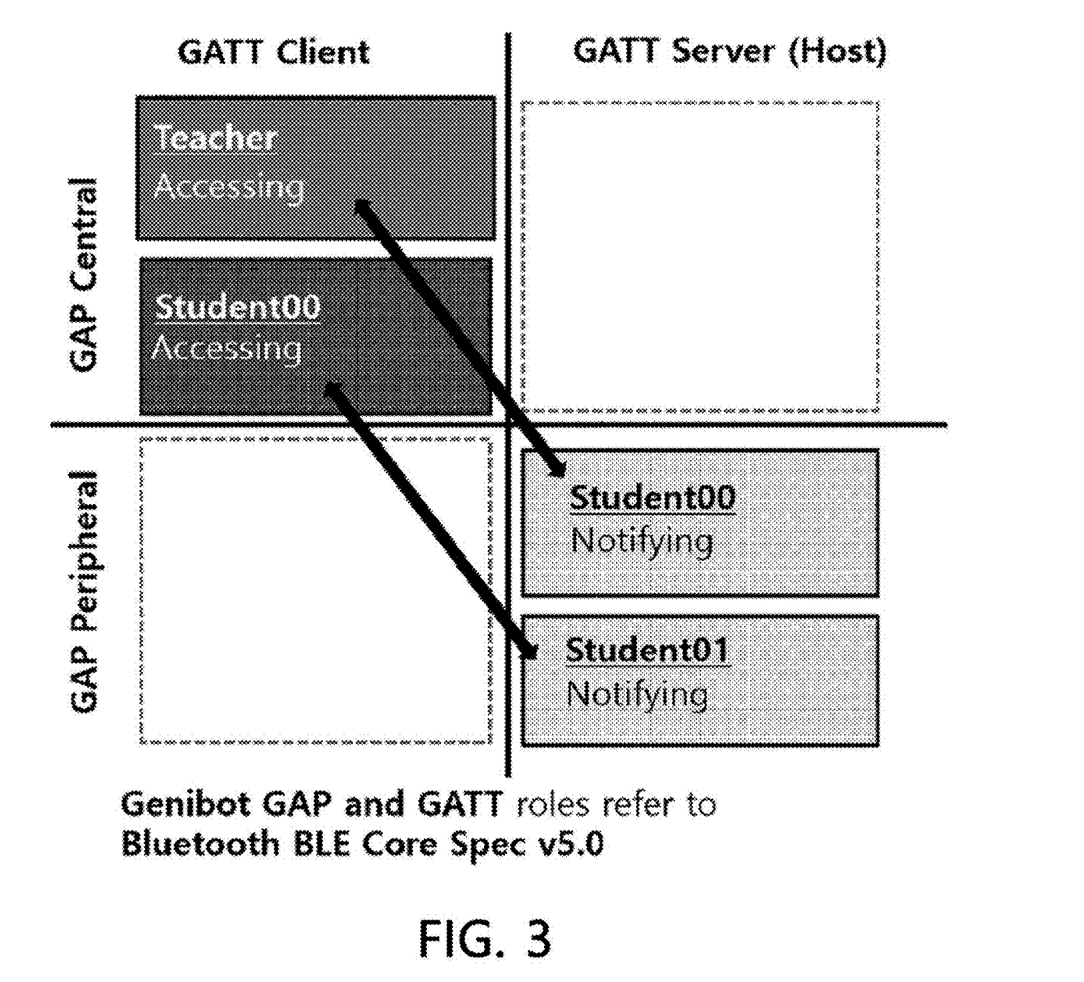
FIG. 3 is a diagram illustrating a star network topology according to the present embodiment.

FIG. 3 is a diagram illustrating a star network topology according to the present embodiment.

As illustrated in FIG. 3, the primary instructor terminal 110 is a host, and the member terminal 120 is a client, and the primary instructor terminal 110 and the member terminal 120 communicate with each other using an IoT star network. A member of the IoT star network consists of either a host or a client. One host may host approximately 20 clients. The host can serve as a broadcaster and an observer at the same time.

Figure 4:
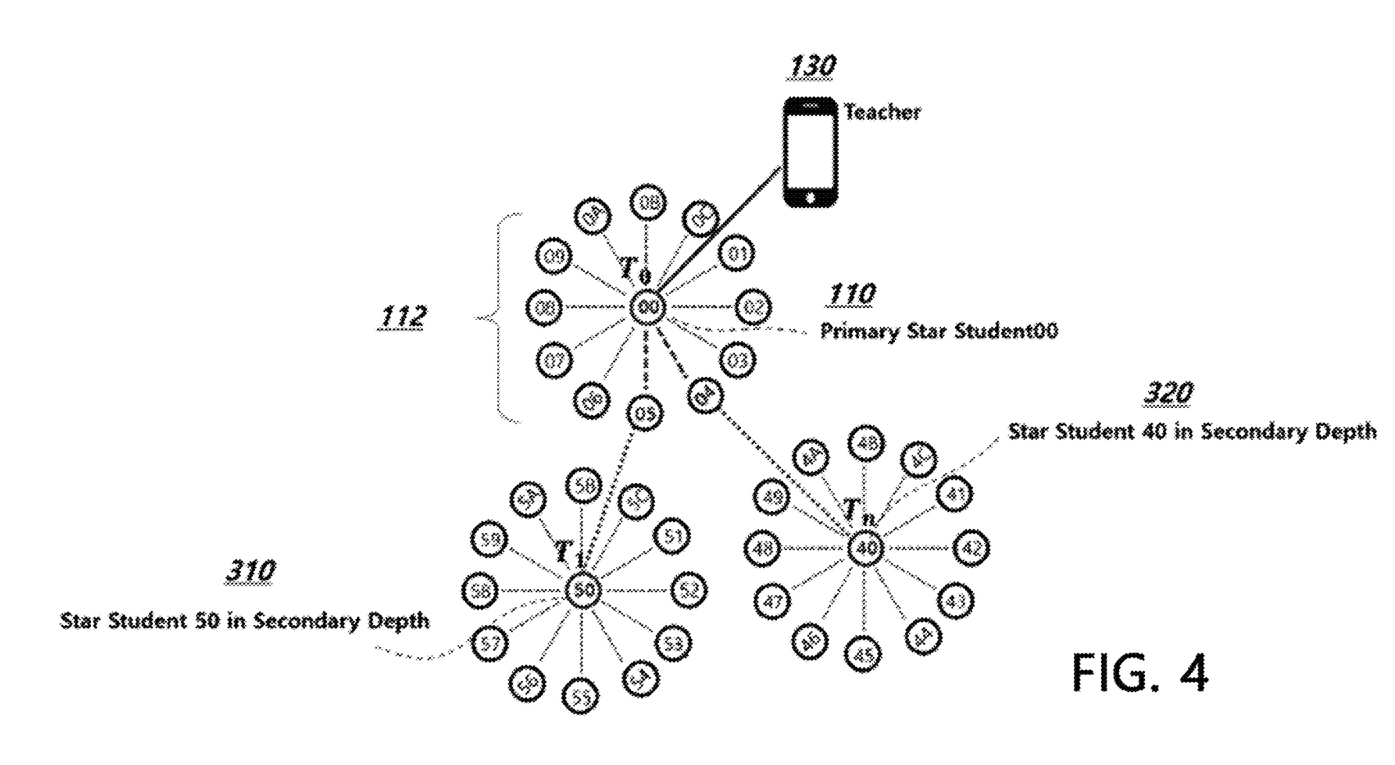
FIG. 4 is a diagram illustrating a relationship between an instructor terminal and a member terminal according to the present embodiment.

FIG. 4 is a diagram illustrating a relationship between an instructor terminal and a member terminal according to the present embodiment.

The management terminal 130 sets the first connected terminal as the primary instructor terminal $T_0$ 110. The management terminal 130 defines a total connection link count N (maximum 64), and then sets the first connected terminal as the primary instructor terminal $T_0$ 110. The primary instructor terminal 110 transmits an observation message or a broadcasting message to a member terminal group.

As illustrated in FIG. 4, the primary instructor terminal 110 broadcasts an instructor message to a primary group of clients of 01 to 0C. The primary instructor terminal 110 observes the member messages of the terminals in the primary group. The primary instructor terminal 110 selects up to 12 member terminals of up to a total link count received from the management terminal 130.

A member terminal (member ID No. 40) and a member terminal (member ID No. 50) as one of the terminals in the primary group connected with the primary instructor terminal 110 are set as the secondary instructor terminals 210 and 220.

The additional secondary instructor terminal (member ID No. 40) 220 broadcasts an instructor message to client terminals 41 to 4C and observes the member message. The additional secondary instructor terminal (member ID No. 40) 220 may select an auxiliary client member link count of 01 (member ID No. 41) to 12 (member ID No. 41) in the connecting link order until the total link count is equal to the number defined by the instructor.

If the total link count is matched, the instructor sends a message to the primary group and the secondary group to stop the connection of peer members. When a disconnection or long-distance detection event occurs, the primary or secondary groups immediately report the event to the instructor terminal.

The star network illustrated in FIG. 4 may have the same structure as that of a star network of the Internet of Things, and the function of each of nodes may be implemented through wearable devices.

For example, nodes serving as a hub, a switch, and a router at a central connection point of the star network include the primary instructor terminal 110, the secondary instructor terminal 210, and the additional secondary instructor terminal 220.

The primary instructor terminal 110, the secondary instructor terminal 210, and the additional secondary instructor terminal 220 may serve as the hub, the switch, and the router at the central connection point and may operate according to an algorithm corresponding to data when receiving the data from the member terminal 120.

The primary instructor terminal 110 on the star network is paired with the member terminal of the primary group, and determines a distance from the member terminal 120 based on the data transmitted from the paired member terminal.

The secondary instructor terminal 210 on the star network is paired with the member terminal of the secondary group, and determines a distance from the member terminal 120 based on the data transmitted from the paired member terminal.

The additional secondary instructor terminal 220 on the star network is paired with the member terminal of the secondary group, and determines a distance from the member terminal 120 based on the data transmitted from the paired member terminal.

For example, after a teacher creates data using the management terminal 130 at the center, the teacher may transmit the data to its own primary instructor terminal 110 to operate the primary instructor terminal 110, and at the same time, operate a subordinate secondary instructor terminal 210 and an additional secondary instructor terminal 220 in the same manner, which is connected to the primary instructor terminal 110.

A member terminal in the primary group may transmit data in the form of a message to the primary instructor terminal 110 connected by a short-range wireless communication method. The data may be interpreted as a set of commands for controlling by combining various commands in a time series.

The member terminal 120 in the primary group may notify its existence to the primary instructor terminal 110 through an advertising operation within a distance that enables short-range wireless communication with the primary instructor terminal 110.

The primary instructor terminal 110 may transmit data received from the member terminals 120 in the primary group in a broadcasting manner to provide the management terminal 130 with the data.

The primary instructor terminal 110 may determine the number of the plurality of member terminals 120 currently in the vicinity through the advertising operation of the plurality of member terminals 120 in the primary group.

Thereafter, the plurality of member terminals 120 in the primary group receiving the data may reply a response message to the primary instructor terminal 110. When the primary instructor terminal 110 broadcasts the data and replies all response messages from the plurality of member terminals 120 in the primary group, the primary instructor terminal 110 may broadcast a specific message in consecutive time slots.

The time slots of the primary instructor terminal 110 and the member terminals 120 in the primary group are synchronized in time. The primary instructor terminal 110 instructs a reset of the time slot by transmitting a signal for resetting the time slot, and the member terminal 120 in the primary group during advertising may reset a timer and a phase when receiving the signal for resetting from the primary instructor terminal 110.

The primary instructor terminal 110 is paired with the plurality of member terminals by a predetermined number based on Bluetooth to form a primary group constituting a star network.

When there is a terminal which is moving far away from a predetermined threshold or more by exchanging the message between the primary instructor terminal 110 and the member terminals of the primary group and using received signal strength indication (RSSI), a notification is generated to the terminal far away from the predetermined threshold or more and the primary instructor terminal 110.

The primary instructor terminal 110 is paired with the plurality of member terminals to be paired in the order of increasing RSSI or the time order of requesting a connection to form the primary group.

The primary instructor terminal 110 checks discovery names of the plurality of member terminals 120 to be paired, and allows only terminals having names matching predetermined names among the discovery names to be paired so as to form the primary group.

The primary instructor terminal 110 additionally checks subnames of the discovery names to group only terminals having the same subnames to be paired so as to form the primary group.

The primary instructor terminal 110 receives a report indicating that all the member terminals 120 have been paired by the predetermined number, from the secondary instructor terminal 210 and sets the other one of the members of the primary group as the additional secondary instructor terminal 220 which is the instructor and the member.

In the secondary instructor terminal 210, some members of the primary group are paired with a predetermined number of other member terminals based on Bluetooth, which are not paired with the primary instructor terminal among the plurality of member terminals as the instructor and the member to form a secondary group constituting the subordinate star network of the primary group.

When there is a terminal which is moving far away from a predetermined threshold or more by exchanging the message between the secondary instructor terminal 210 and the member terminals of the secondary group and using RSSI, a notification is generated to the terminal moving far away from the predetermined threshold or more and the primary instructor terminal 110 that is the leading instructor.

The secondary instructor terminal 210 checks discovery names of the plurality of member terminals 120 to be paired, and allows only terminals having names matching predetermined names among the discovery names to be paired so as to form the secondary group.

The secondary instructor terminal 210 additionally checks subnames of the discovery names to group only terminals having the same subnames to be paired, so as to form the secondary group.

Figure 5:
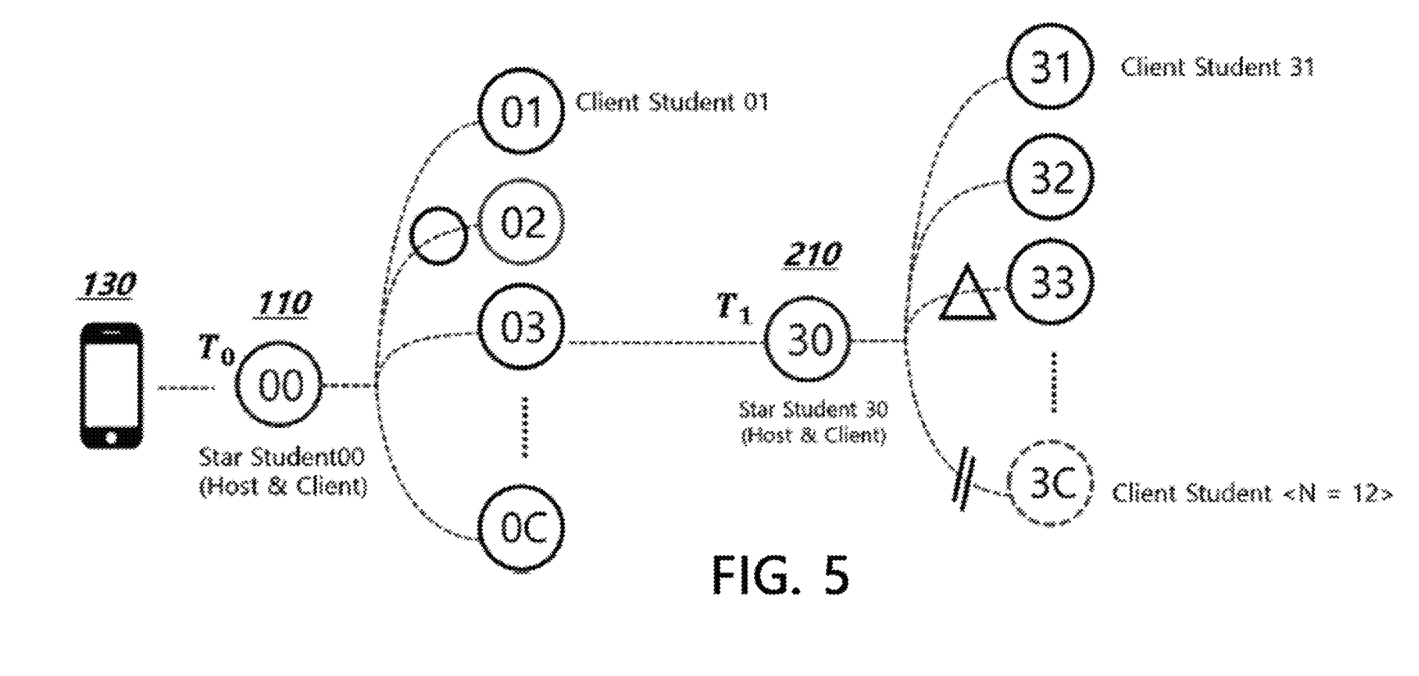
FIG. 5 is a diagram for describing disconnection between an instructor terminal and a member terminal according to the present embodiment.

FIG. 5 is a diagram for describing disconnection between an instructor terminal and a member terminal according to the present embodiment.

The primary instructor terminal 110 or the secondary instructor terminal 210 generates a disconnection event (GAP Event) when there is a breakaway terminal which is moving far away from a threshold distance or more among the member terminals of the primary group or the secondary group.

When the breakaway terminal enters within the threshold distance, the primary instructor terminal 110 or the secondary instructor terminal 210 switches the disconnection event to a connection event after connecting the breakaway terminal to the primary group or the secondary group. When the breakaway terminal is connected to the primary group or the secondary group, the breakaway terminal changes the discovery name to indicate whether a connection exists, and then switches to an advertising state.

In a star network topology illustrated in FIG. 5, when a link is broken when a plurality of clients are connected to one host, the host immediately recognizes the disconnection of each client.

When member 02 sends a lock message to client 02 (member ID 02) by pressing a button, client 02 (member ID 02) transmits a lock message to the primary instructor terminal 110.

The secondary instructor terminal 210 (member ID No. 30) reports to the primary instructor terminal 110 the fact that the link with 3C of the member group is broken. The secondary instructor terminal 210 (member ID No. 30) simultaneously broadcasts a message to terminals in all member groups or observes a client message.

When the RSSI of a member terminal (member ID No. 33) connected with the secondary instructor terminal 210 (member ID No. 30) is lower than −90 dBm, the secondary instructor terminal 210 (member ID No. 30) notifies the member terminal (member ID No. 33) of the fact that the signal intensity is lowered.

The above description just illustrates the technical spirit of the present invention and various changes and modifications can be made by those skilled in the art to which the present invention pertains without departing from an essential characteristic of the present invention. Accordingly, the various embodiments disclosed in the present invention are not intended to limit the technical spirit but describe the present invention and the technical spirit of the present invention is not limited by the following embodiments. The protection scope of the embodiment should be interpreted by the appended claims and all technical spirit in the equivalent range thereto should be interpreted to be embraced by the claims of the embodiment.

The invention claimed is:

1. A grouping system using a Bluetooth-based star network comprising:
   a primary instructor terminal that is paired with a predetermined number of member terminals based on Bluetooth to form a primary group constituting a star network;
   a secondary instructor terminal which is paired with a predetermined number of other member terminals based on Bluetooth, which are not paired with the primary instructor terminal, to form a secondary group constituting a subordinate star network of the primary group, the secondary instructor terminal being one of the member terminals in the primary group; and
   a management terminal which is paired with the primary instructor terminal to visually display tags of the member terminals breaking away from or joined in the primary group and the secondary group,
   wherein when all of the member terminals in the secondary group are paired with the secondary instructor terminal, the secondary instructor terminal sends a first report to the primary instructor terminal paired with the secondary instructor terminal in the primary group,
   wherein when a connection to a member terminal in the secondary group is broken, the secondary instructor terminal sends a second report to the primary instructor terminal paired with the secondary instructor terminal in the primary group,
   wherein the primary instructor terminal sends a first warning notification to a first potential breakaway terminal in the primary group, a distance between the first potential breakaway terminal and the primary instructor terminal being greater than a threshold value based on received signal strength indication (RSSI),
   wherein the secondary instructor terminal sends a second warning notification to the primary instructor terminal and to a second potential breakaway terminal in the secondary group, a distance between the second potential breakaway terminal and the secondary instructor terminal being greater than the threshold value based on the RSSI.

2. The grouping system using the Bluetooth-based star network of claim 1, wherein the primary instructor terminal is paired with the predetermined number of member terminals in the order of increasing RSSI or the time order of requesting a connection to form the primary group.

3. The grouping system using the Bluetooth-based star network of claim 2, wherein the primary instructor terminal checks discovery names of the predetermined number of member terminals to be paired, and allows only terminals having names matching predetermined names among the discovery names to be paired so as to form the primary group.

4. The grouping system using the Bluetooth-based star network of claim 3, wherein the primary instructor terminal additionally checks subnames of the discovery names to group only terminals having the same subnames to be paired so as to form the primary group.

5. The grouping system using the Bluetooth-based star network of claim 4, wherein the secondary instructor terminal checks discovery names of the predetermined number of member terminals to be paired, and allows only terminals having names matching predetermined names among the discovery names to be paired so as to form the secondary group.

6. The grouping system using the Bluetooth-based star network of claim 5, wherein the secondary instructor terminal additionally checks subnames of the discovery names to group only terminals having the same subnames to be paired so as to form the secondary group.

7. The grouping system using the Bluetooth-based star network of claim 6, wherein the primary instructor terminal sets one of the member terminals in the primary group as an additional secondary instructor terminal.

8. The grouping system using the Bluetooth-based star network of claim 7, wherein the primary instructor terminal or the secondary instructor terminal generates a disconnection event (GAP Event) when there is a breakaway terminal which is moving far away from a threshold distance or more among the member terminals of the primary group or the secondary group, and when the breakaway terminal enters within the threshold distance, the primary instructor terminal or the secondary instructor terminal switches the disconnection event to a connection event after connecting the breakaway terminal to the primary group or the secondary group.

9. The grouping system using the Bluetooth-based star network of claim 8, wherein when the breakaway terminal is connected to the primary group or the secondary group, the breakaway terminal changes the discovery name to indicate whether a connection exists, and then switches to an advertising state.

10. A grouping method using a Bluetooth-based star network comprising:
    pairing a primary instructor terminal with a predetermined number of member terminals based on Bluetooth to form a primary group constituting a star network;
    pairing a secondary instructor terminal with a predetermined number of member terminals based on Bluetooth, which are not paired with the primary instructor terminal, to form a secondary group constituting a subordinate star network of the primary group, the secondary instructor terminal being one of the member terminals in the primary group;
    visually displaying, by a management terminal which is paired with the primary instructor terminal, tags of the member terminals breaking away from or joined in the primary group and the secondary group;
    when all of the member terminals in the secondary group are paired with the secondary instructor terminal, sending, by the secondary instructor terminal, a first report to the primary instructor terminal paired with the secondary instructor terminal in the primary group;

when a connection to a member terminal in the secondary group is broken, sending, by the secondary instructor terminal, a second report to the primary instructor terminal paired with the secondary terminal in the primary group;

sending, by the primary instructor terminal, a first warning notification to a first potential breakaway terminal in the primary group, a distance between the first potential breakaway terminal and the primary instructor terminal being greater than a threshold value based on received signal strength indication (RSSI); and sending, by the secondary instructor terminal, a second warning notification to the primary instructor terminal and to a second potential breakaway terminal in the secondary group, a distance between the second potential breakaway terminal and the secondary instructor terminal being greater than the threshold value based on the RSSI.

* * * * *